Nov. 5, 1963 R. O. BLAIR 3,109,993

COMPRESSION CIRCUIT

Filed Sept. 4, 1959 2 Sheets-Sheet 1

INVENTOR.
ROBERT O. BLAIR
BY Moody and Phillips
ATTORNEYS

INVENTOR.
ROBERT O. BLAIR
BY Moody and Phillips
ATTORNEYS 3,109,993
COMPRESSION CIRCUIT Robert O. Blair, Marion, Iowa, assignor to Collins Radio Company, Cedar Rapids, Iowa, a corporation of Iowa Filed Sept. 4, 1959, Ser. No. 839,272
2 Claims. (Cl. 330—108)

This invention relates generally to compressor circuits and more specifically to a single stage compressor circuit of the type which varies the input impedance to an amplifier in order to maintain a near-constant amplitude signal supplied to said amplifier.

Generally speaking, there are two principal types of compressor circuits known in the art, one of which types involves the changing of the bias potential of the control grid of a variable $\mu$ tube (employed in an amplifier) in accordance with the level of the output signal of the amplifier to maintain a near-constant output signal level. The other general type of compressor circuit accomplishes the compression function by circuit means for rectifying the amplifier output signal and employing said rectified signal as a control to vary the amplifier input impedance presented to the input signal. The present invention relates to the last-mentioned type of compression circuit.

In certain electronic circuits it is desirable to have an amplifier function linearly over a range of relatively small signals during the greatest portion of its operating time. Occasionally, however, it is necessary that the amplifier be able to, without distortion, handle signals many times greater than the largest of the small signals previously mentioned. A specific example of such an application occurs in a device known as a radio sextant which functions to track astronomical bodies such as the sun or moon. If, for example, the device is employed in tracking the sun, the signal required to control the necessary servo system may be small (in the neighborhood of a few tenths of a volt). When sunset occurs, however, it may become necessary to track some other celestial body, such as the moon for example, and the servo system means then function to slue the tracking mechanism, including the antenna, toward the moon. The signal supply to the servo-mechanism during such transition period could be of the order of 10 or 12 volts. It is necessary that the amplifier mentioned above handles the larger signals without appreciable distortion being introduced therein. Rather than construct the elaborate and expensive equipment necessary to handle linearly the range of small voltages of a few tenths of a volt or less to values of 10 or 12 volts, it is found more expedient to provide a circuit which will compress the larger signals before they are supplied to the amplifier, but which will not function to compress the signals in the range of small voltages.

There are, in the prior art, compression circuits having the immediately aforementioned characteristics. Such prior art devices, however, are generally quite complicated and require several vacuum tubes and oftentimes several diodes.

An object of the present invention is a compression circuit having the operating characteristics described above but which is quite simple in construction and reliable in operation.

A further aim of the present invention is a compressor circuit which may be added to an existing amplifier with a minimum of internal changes in the amplifier.

A third object of the invention is the improvement of compressor circuits generally.

In accordance with the invention there is provided in a circuit, including an amplifier, a compressor circuit including means for rectifying and filtering the output signal of the amplifier to provide a variable D.-C. control voltage. There is further provided an electron valve comprising an electron emitter electrode, an electron collector electrode, and on electron control electrode. The input signal is supplied across a voltage divider means having a tap thereon, which tap is connected to said electron emitter electrode.

As the magnitude of the input signal increases the output of the amplifier tends to increase, which increase produces a larger rectified control voltage. The larger rectified control voltage functions to lessen the input impedance of the electron valve, which input impedance is in parallel with that portion of the voltage divider across which the signal applied to the amplifier appears. The lessened input impedance will, of course, function to reduce the resultant portion of the input signal supplied to the amplifier. On the other hand should the magnitude of the input signal decrease the magnitude of the rectified output signal of the amplifier will tend to decrease which will increase the input impedance of the electron valve, thus tending to increase the portion of the input signal supplied to the amplifier.

The above mentioned and other objects and features of the invention will be more fully understood from the following detailed description thereof when read in conjunction with the drawings in which.

Figure 1:
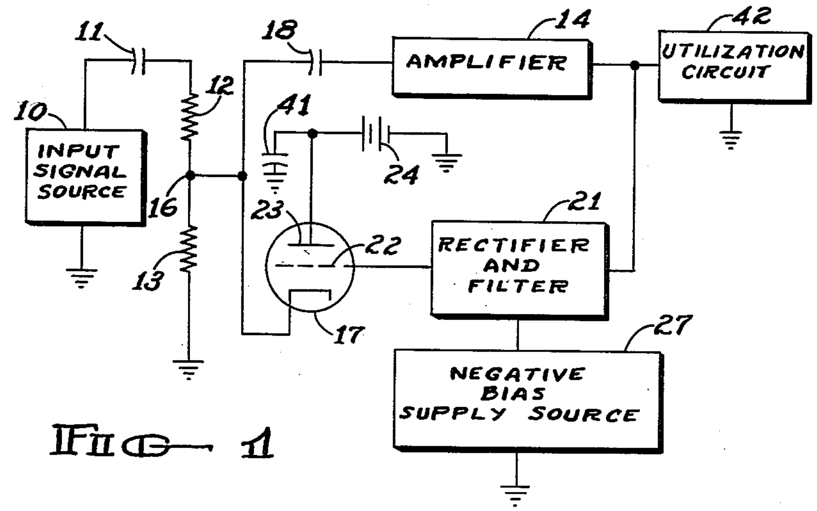
FIG. 1 is a schematic diagram of a general form of the invention.

Referring now to FIG. 1 the input signal is supplied from the input signal source 10 through D.-C. blocking capacitor 11 to a voltage divider consisting of resistors 12 and 13. The D.-C. blocking capacitor 11 is large enough so as to present no appreciable impedance to the applied A.-C. signal. The actual signal applied to the input of the amplifier 14 is that portion of the input signal appearing across resistor 13. It will be apparent that if the impedance presented to point 16 with respect to ground potential is altered the portion of the input signal supplied to the amplifier 14 will also be changed. In accordance with this invention the impedance presented to the point 16 is altered in a controlled manner by altering the input impedance of the tube 17.

If the magnitude of the input signal increases it is required that the impedance presented to the point 16 must decrease (the value of resistor 12 remaining constant) so that the portion of the input signal appearing at point 16 will be decreased, thus tending to maintain at a constant amplitude the signal supplied to the amplifier 14 through the coupling capacitor 18. As indicated hereinbefore, such decrease in impedance presented to the point 16 is accomplished by decreasing the input impedance of the tube 17.

In order to control the input impedance of the tube 17 the output signal of the amplifier 14 is rectified and filtered by circuit means 21 to produce a D.-C. voltage whose amplitude varies in accordance with the amplitude of the output signal of amplifier 14. The aforementioned D.-C. voltage is supplied to the grid 22 of the tube 17. The plate 23 of tube 17 is connected to the positive terminal of battery source 24 which is bypassed by R.-F. bypass capacitor 41.

As indicated hereinbefore it is desirable that compression be delayed until the input signal voltage exceeds a certain predeterminable value. Such threshold voltage is determined by supply to the rectifier and filtering circuit a biasing voltage which opposes in polarity the D.-C.

output voltage of the rectifier and filtering circuit 21. Such biasing means will be more clearly understood from a description of the structure shown in FIG. 2.

Figure 2:
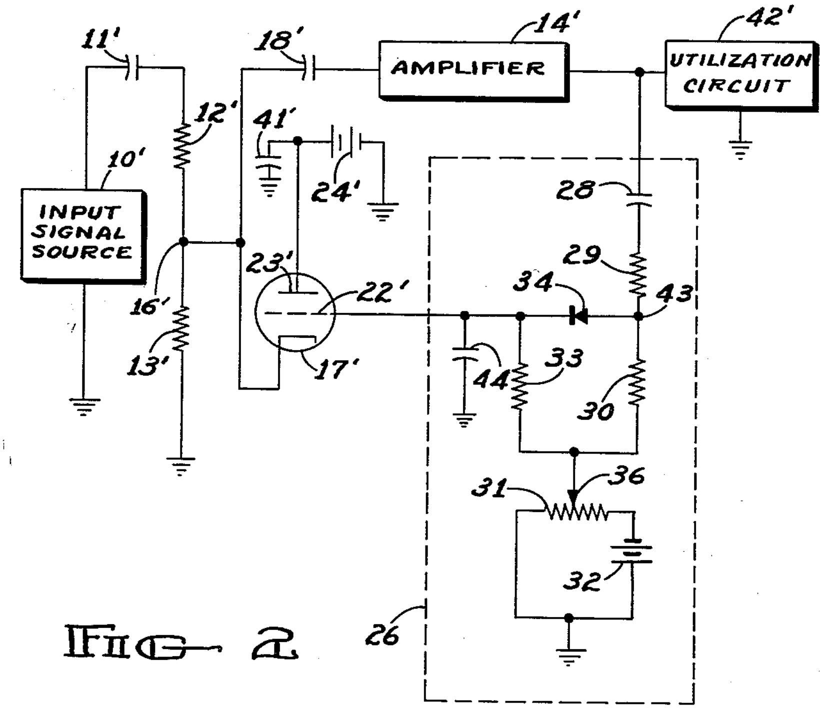
FIG. 2 is a schematic sketch of a more specific form of the invention.

In FIG. 2 the elements designated by the primed reference characters have corresponding elements in FIG. 1 and operate and coact in the same manner as the said corresponding elements of FIG. 1. The circuitry within the dotted rectangle 26′ corresponds to the blocks 21 and 27 of FIG. 1 and shows, in detail, the structure for rectifying and filtering the output of amplifier 14 and also for providing the negative bias mentioned above. The output signal of amplifier 14′ is supplied directly to utilization means 42′ and to point 43 through blocking capacitor 28 and current limiting resistor 29. Resistor 30 functions in cooperation with resistor 29 to produce an A.-C. current path from the output of the amplifier to ground potential through the negative bias supply which consists of resistor 31 and battery source 32. The A.-C. voltage appearing across resistor 30 is impressed across the series arrangement of resistor 33 and diode 34, which elements function to produce a D.-C. voltage across filter capacitor 44. Such D.-C. voltage is supplied to the control grid 22′ of tube 17′. The magnitude of this D.-C. voltage will follow variations in changes of the average intensity of pulses passed by the rectifier 34 at a rate in accordance with the values of capacitor 44 and resistor 33. More specifically, for example, if it be desired that the D.C. voltage supplied to grid 22′ be able to follow the peak amplitude of each successive pulse passed by diode 34 and such pulses have a frequency within the audio range, say about 5000 cycles per second, then the capacitor 44 can have a value of about 1.5 microfarads, and the resistor 33 can have a value of about 1 megohm. If the frequency of the signal passed by diode 34 is higher, the value of capacitor 44 should be lower. Essentially, the magnitudes of capacitor 44 and resistor 33 as well as the other circuit components can be selected in accordance with the particular application in which the invention is employed.

As indicated above the negative bias supply is comprised of negative battery 32 connected across resistor 31 having a tap 36 thereon.

It will be apparent that in the absence of an output signal from amplifier 14′ that the potential supplied to the grid 22′ will be the potential on the tap 36 of the negative bias supply, which potential is a negative potential. Such negative potential will maintain the tube 17 in a cut-off condition until such time as the output signal of the amplifier 14′ increases to a value whereupon rectification and filtering thereof will produce across the capacitor 44 a voltage positive enough to overcome the negative bias potential and cause conduction in tube 17′. It is at this point of conduction, also referred to herein as the threshold value, that compression begins. Until the amplifier output signal has increased to this value the tube 17′ remains in a cut-off position and the portion of the signal supplied to the amplifier 14′ is merely proportional to the ratio of resistor 13′ to the sum of resistor 13′ plus resistor 12′.

As indicated hereinbefore the effect of varying the conductivity of tube 17′ is like varying an impedance in parallel with the resistor 13′. Such a statement is not entirely accurate, however. In the following paragraphs there is set forth a more exact analysis of the circuit.

Figure 3:
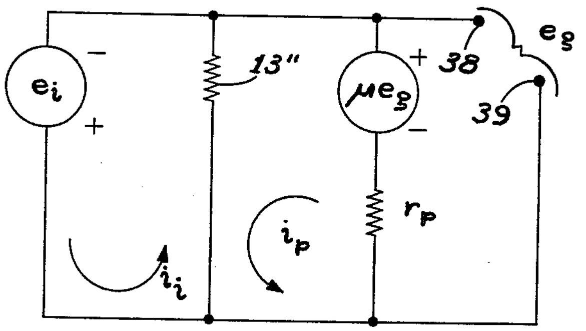
FIG. 3 is an equivalent circuit of a portion of the circuit shown in FIG. 2; and, FIG. 4 is a curve showing a characteristic of the circuit shown in FIG. 2.

Referring now to FIG. 3 there is shown an equivalent circuit of that portion of the circuit of FIG. 2 including input signal source 10′, resistor 13′, and the tube 17′.

In FIG. 3 $e_i$ represents a signal supplied from the input signal source 10′ (FIG. 2) across the resistor 13′ (FIG. 2), which resistor is represented by the referenced character 13″ in FIG. 3. The generator $\mu e_g$ represents the signal generated in the tube 17′ and $r_p$ represents the dynamic plate resistance of the tube 17′. Elements 38 and 39 of FIG. 3 represent respectively the cathode and the grid element of tube 17′ of FIG. 2. The following expressions can be written from an examination of the diagram of FIG. 3;

$$e_i = i_i R_{13''} - i_p R_{13''} \qquad (1)$$

$$\mu e_g = -i_i R_{13''} + i_p (R_{13''} + r_p) \qquad (2)$$

$$e_g = i_i R_{13''} - i_p R_{13''} \qquad (3)$$

$$r_i = \frac{e_i}{i_i} \qquad (4)$$

where $r_i$ is the resultant resistance from point 16′ to ground potential in FIG. 2.

Manipulation of the above expressions will result in the following expression:

$$r_i = \left[ R_{13''} - \frac{(\mu+1) R_{13''}^2}{(\mu+1) R_{13''} + r_p} \right] \qquad (5)$$

An examination of Expression 5 will reveal that when the tube 17 approaches cut-off condition and its amplification factor $\mu$ approaches zero;

$$r_i = \left[ R_{13''} - \frac{R_{13''}^2}{R_{13''} + r_p} \right] \qquad (6)$$

and since $r_p$ will approach infinity under such cut-off condition, the expression $$\frac{(\mu+1) R_{13''}^2}{(\mu+1) R_{13''} + r_p}$$

will approach 0 and $r_i$ will approach $R_{13''}$.

However, as tube 17 becomes more conductive the amplification factor $\mu$ will become larger and $r_p$ will become smaller so that the expression $$\frac{(\mu+1) R_{13''}^2}{(\mu+1) R_{13''} + r_p}$$

will approach $R_{13''}$ whereupon $r_i$ will approach 0. In actual practice $r_i$ does not reach 0 since the amplification factor $\mu$ of the tube always has a finite maximum.

Figure 4:
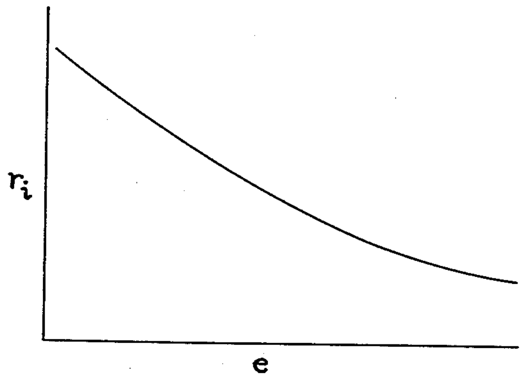

In FIG. 4 there is shown a curve illustrating the relationship between $r_i$ and the voltage $e_g$ applied across the grid-cathode gap of tube 17. Such curve illustrates that $r_i$ decreases as the voltage applied across the grid 22′-cathode gap increases.

In accordance with one embodiment of the invention the following circuit constants may be employed in the circuit of FIG. 2, in which the gain of the amplifier is 120;

| | |
|---|---|
| $C_{11'}$ | .1 microfarad. |
| $C_{18'}$ | .1 microfarad. |
| $C_{28}$ | .01 microfarad. |
| $C_{34}$ | 1.5 microfarads. |
| $R_{12'}$ | 100K ohms. |
| $R_{29}$ | 3.3K. |
| $R_{30}$ | 470K. |
| $R_{33}$ | 1 megohm. |
| $R_{13'}$ | 47K. |

Diode 34 may be of the type 1N456 and the tube 17 may be one half of a 5751 vacuum tube, the other half of said vacuum tube being employed in the amplifier circuit, if desired. The plate voltage source 24′ can be 250 volts and the negative bias at the tap 36 can be a minus 18 volts.

It is to be noted that the forms of the invention herein shown and described are but preferred embodiments thereof and that various changes may be made in the values of circuit constants employed and in circuit arrangement without departing from the spirit or scope of the invention.

I claim:

1. In circuit means comprising an amplifier having an input circuit, a compressor circuit comprising means for rectifying the output signal of said amplifier, an electron valve comprising an electron emitting electrode, an electron collecting electrode, and an electron control electrode, means for supplying the rectified output signal of said amplifier to said electron control electrode, voltage dividing means having a tap thereon, means for supplying an input signal directly across said voltage divider means, means for connecting said tap directly to said electron emitting electrode, means for capacitively coupling said tap to the input circuit of said amplifier, the said electron valve being constructed and arranged to have its impedance, as presented to said tap, vary in a predetermined manner in response to the magnitude of the rectified output signal supplied to said electron control electrode to control the amplitude of the signal supplied to said input circuit of said amplifier, and means for biasing said electron control electrode to a value below the electron collecting electrode current cut-off value when the magnitude of said rectified output signal is below a predetermined value.

2. In circuit means comprising an amplifier having an input circuit, a compressor circuit comprising means for rectifying the output signal of said amplifier, an electron valve comprising an electron emitting electrode, an electron collecting electrode, and an electron control electrode, means for supplying the rectified output signal of said amplifier to said electron control electrode, voltage dividing means having a tap thereon, means for supplying an input signal directly across said voltage divider means, means for connecting said tap to said electron emitting electrode and to the input circuit of said amplifier, the said electron valve being contructed and arranged to have its impedance, as presented to said tap, vary in a predetermined manner in response to the magnitude of the rectified output signal supplied to said electron control electrode to control the amplitude of the signal supplied to said input circuit of said amplifier and means for biasing said electron control electrode to a value below the electron collecting electrode current cut-off value when the magnitude of said rectified output signal is below a predetermined value.

References Cited in the file of this patent

UNITED STATES PATENTS

| | | |
|---|---|---|
| 2,540,643 | Armstrong | Feb. 6, 1951 |
| 2,585,854 | Scott | Feb. 12, 1952 |
| 2,722,600 | Forbes et al. | Nov. 1, 1955 |
| 2,801,300 | Crane et al. | July 30, 1957 |